United States Patent
Sharp-Paul et al.

(10) Patent No.: US 10,425,278 B2
(45) Date of Patent: *Sep. 24, 2019

(54) NETWORK NODE POLICY GENERATION AND IMPLEMENTATION

(71) Applicant: UpGuard, Inc., Mountain View, CA (US)

(72) Inventors: Alan James Sharp-Paul, Los Altos, CA (US); Michael Franz Baukes, Sunnyvale, CA (US)

(73) Assignee: Upguard, Inc., Mountain View, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/723,961

(22) Filed: Oct. 3, 2017

(65) Prior Publication Data

US 2018/0026843 A1    Jan. 25, 2018

Related U.S. Application Data

(63) Continuation of application No. 14/574,232, filed on Dec. 17, 2014, now Pat. No. 9,813,292.

(51) Int. Cl.
*H04L 12/24* (2006.01)
*G06F 15/177* (2006.01)
(Continued)

(52) U.S. Cl.
CPC ...... *H04L 41/0813* (2013.01); *H04L 41/0869* (2013.01); *H04L 41/0893* (2013.01);
(Continued)

(58) Field of Classification Search
CPC .. G06F 15/177; G06F 3/04842; G06F 3/0481; G06F 3/0482; G06F 3/0484; G06F 9/44505; G06F 11/3664; G06F 11/1417; H04L 41/0803; H04L 41/0806; H04L 41/0813; H04L 41/0869; H04L 41/0853;
(Continued)

(56) References Cited

U.S. PATENT DOCUMENTS 8,839,234 B1    9/2014   Voronkov et al.
9,621,424 B2    4/2017   Luty
(Continued)

OTHER PUBLICATIONS

United States Office Action, U.S. Appl. No. 14/574,232, dated Feb. 24, 2017, 11 pages.

*Primary Examiner* — Jungwon Chang
(74) *Attorney, Agent, or Firm* — Fenwick & West LLP

(57) ABSTRACT

An operator node is configured to enable the management of nodes communicatively coupled to the operator node via a network. A selection of node objects is received by the operator node, the selected node objects including software components for inclusion within a node configuration. A configuration policy is generated based on the selected objects, the configuration policy including a set of tests (such as scripts or executables) that, when run, test for the presence of one or more of the selected node objects. A target node is scanned to determine the configuration of the target node, and the set of tests are applied to identify a set of objects identified by the policy but not installed at the target node. The target node is then re-configured to install the identified set of objects at the target node.

20 Claims, 4 Drawing Sheets

(51) Int. Cl.
   *H04L 29/06* (2006.01)
   *G06F 3/0484* (2013.01)
   *H04L 29/08* (2006.01)
   *H04L 29/12* (2006.01)

(52) U.S. Cl.
   CPC ........ *G06F 3/04842* (2013.01); *G06F 15/177* (2013.01); *H04L 41/0803* (2013.01); *H04L 41/0806* (2013.01); *H04L 41/0816* (2013.01); *H04L 41/22* (2013.01); *H04L 61/2015* (2013.01); *H04L 63/101* (2013.01); *H04L 67/34* (2013.01)

(58) Field of Classification Search
   CPC . H04L 41/0893; H04L 41/0816; H04L 41/22; H04L 63/101; H04L 67/34; H04L 61/2015
   USPC ........................................................ 709/220
   See application file for complete search history.

(56) References Cited

U.S. PATENT DOCUMENTS

| | | | |
|---|---|---|---|
| 9,813,292 B2 * | 11/2017 | Sharp-Paul | ......... H04L 41/0813 |
| 2002/0120731 A1 | 8/2002 | Walker et al. | |
| 2003/0231211 A1 | 12/2003 | Shah et al. | |
| 2004/0193703 A1 * | 9/2004 | Loewy | ................ H04L 41/0893 709/220 |
| 2006/0212924 A1 | 9/2006 | Xie et al. | |
| 2006/0282458 A1 | 12/2006 | Tsyganskiy et al. | |
| 2007/0011283 A1 | 1/2007 | Brown et al. | |
| 2007/0189288 A1 | 8/2007 | Andrews et al. | |
| 2007/0283344 A1 | 12/2007 | Apte et al. | |
| 2008/0028048 A1 | 1/2008 | Shekar CS et al. | |
| 2009/0228953 A1 | 9/2009 | Hu et al. | |
| 2010/0299419 A1 * | 11/2010 | Ramankutty | ......... H04W 24/02 709/221 |
| 2011/0004914 A1 * | 1/2011 | Ennis, Jr. | ............ H04L 41/0853 726/1 |
| 2012/0151326 A1 | 6/2012 | Cross, Jr. et al. | |
| 2013/0086237 A1 | 4/2013 | Cutler et al. | |
| 2013/0246780 A1 * | 9/2013 | Wright | ................ G06F 9/44505 713/100 |
| 2013/0290791 A1 | 10/2013 | Basile et al. | |
| 2014/0026122 A1 * | 1/2014 | Markande | ........... G06F 11/3664 717/124 |
| 2014/0289661 A1 | 9/2014 | Venkatramanan et al. | |
| 2014/0379876 A1 * | 12/2014 | Peterson | ............. G06F 21/6236 709/220 |
| 2015/0199496 A1 | 7/2015 | Deter et al. | |
| 2016/0119204 A1 | 4/2016 | Murasato et al. | |
| 2016/0335071 A1 * | 11/2016 | Ham | .................. G06F 11/1417 |

* cited by examiner

NETWORK NODE POLICY GENERATION AND IMPLEMENTATION

CROSS REFERENCE TO RELATED APPLICATIONS

This application is a continuation of U.S. application Ser. No. 14/574,232, filed Dec. 17, 2014, now U.S. Pat. No. 9,813,292, which is incorporated by reference in its entirety.

FIELD OF ART

This application relates generally to the field of network, and more specifically to the generation and implementation of system configuration policies within a network.

BACKGROUND

Many challenges exist in administrating a network of computing systems ("nodes"), particularly networks with hundreds of, thousands of, or more nodes. Complicating network management further is the potentially large variance in node operating systems, hardware configurations, software configurations, networking configurations, and the like. For instance, two nodes in the same network can include different versions of the same program, different programs, different hot fixes, and different operating systems. As used herein, a node's hardware configuration, operating system configuration, software configuration, network configuration, and other properties or characteristics is referred to collectively as a "node configuration" or simply "configuration" herein. Accordingly, installing or configuring an application on different nodes within the network can have different and often unexpected consequences based on the configuration of the nodes. Thus, there is a need for a tool to allow for the creation and implementation of consistent configuration policies within a network.

SUMMARY

An operator node is configured to enable the management of nodes communicatively coupled to the operator node via a network. The operator node can be a hardware computing system (including a processor a non-transitory computer-readable storage medium storing executable computer instructions) specially configured to manage the configuration one or more other nodes as described herein.

A selection of node objects is received by the operator node, the selected node objects including software components for inclusion within a node configuration. In some embodiments, receiving a selection of node objects includes scanning a test node, determining a configuration of the test node (including the set of objects installed at the test node), and receiving a selection of a subset of the set of objects installed at the test node. The received selection of node objects can be received from a user of the operator node, such as a network manager or administrator. In some embodiments, the set of objects installed at the test node are displayed within a user interface displayed on a display associated with the operator node.

A configuration policy is generated based on the selected objects, the configuration policy including a set of tests (such as scripts or executables) that, when run, test for the presence of one or more of the selected node objects. A target node is scanned to determine the configuration of the target node (including the set of objects installed at the target node). The compliance of the configuration of the target node with the generated policy is determined by running the tests of the policy to identify a set of objects identified by the policy but not installed at the target node. The target node is then re-configured by installing the identified set of objects at the target node.

In some embodiments, the test node and the target node include different hardware, different software, different operating systems, different network configurations, or any other different configuration. In some embodiments, the generated policy includes a domain specific language for a domain other than the domain of the target node. In such instances, the policy can be converted into a universal language or a language specific to the domain of the target node, for instance by querying a universal mapping that maps objects from one domain to one or more other domains. For example, if the generated policy identified a set of objects specific to a first domain, and the target node corresponds to a second domain, the universal mapping can be queried with each object in the set of objects to identify a corresponding object in the second domain. The target node can then be tested for compliance with the converted policy to identify a set of objects identified by the converted policy that are not present within the configuration of the target node.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Node Policy Generation and Implementation

Figure 1:
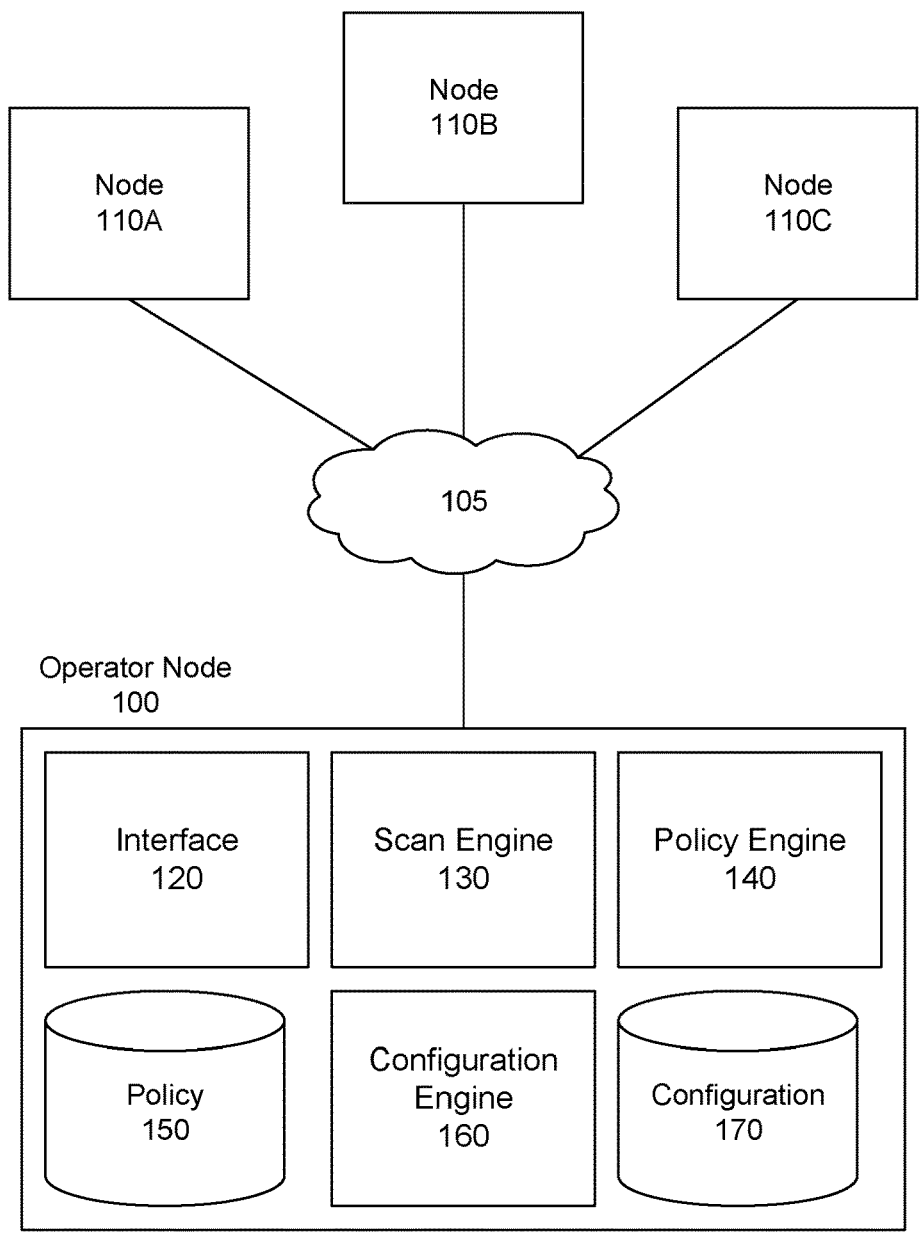
FIG. 1 illustrates a networking environment, according to one embodiment.

FIG. 1 illustrates a networking environment, according to one embodiment. The environment of FIG. 1 includes an operator node 100 and a plurality of additional nodes (nodes 110A, 110B, and 110C) communicatively coupled to the operator node by the network 105. It should be noted that in alternative embodiments, the environment of FIG. 1 can include additional, fewer, or different components than those illustrated in FIG. 1. For instance, alternative embodiments can include any number of nodes (from as few as one node 110 to hundreds or thousands or more nodes). In addition, it should be noted that in some embodiments, the operator node can be configured similarly to or the same as one or more of the nodes 110, but that for the purpose of simplicity, the term "operator node" is used merely to indicate the node from which a node policy is generated or implemented, for instance by a network manager, administrator, or other user, or by an automation application or script (with or without the supervision of a human operator).

Each node 110 is a computing system capable of transmitting or receiving data via the network 105. Examples of nodes include but are not limited to personal computers, laptop computers, server computers, mobile devices (such as tablet computers or mobile phones), specialized computers or systems (such as medical computing systems, financial computing systems, databases, and the like), network computing systems (such as routers, switches, firewall computing systems, and the like), or any other suitable computing system. Each node includes a node configuration that describes one or more properties or characteristics of the node, for instance the hardware configuration of the node (such as the identity, type, brand, properties, or capabilities of one or more hardware components or mounts of the node), the software configuration of the node (such as the identity or version of one or more applications installed on the node, patches or hot fixes installed on the node, files stored at the node, application settings or configurations, scheduled tasks, groups to which the node belongs, packages or services installed at or corresponding to the node, inventory items corresponding to the node, registry keys corresponding to the node, and the like), the operating system configuration of the node (such as the identity or version of the operating system, the identity or version of operating system patches or components, operating system services, operating system configurations or settings, and the like), the networking configuration of the node (such as ports, network interfaces, environment variables, routes, one or more node communicative configurations or settings, one or more security configurations or settings, access control lists or "ACLs" corresponding to the node, and the like), and properties or characteristics corresponding to one or more users of the node. As used herein, each property or characteristic of a node is referred to as a "node object". In some embodiments used herein, node objects are limited to node software or firmware components, such as applications, patches, hot fixes, files, drivers, and the like.

The network 105 can be any suitable network, such as the Internet, a LAN, a MAN, a WAN, a mobile wired or wireless network, a private network, a virtual private network, a direct communication line, and the like. The network can also be a combination of multiple different networks of the same or different types.

The operator node 100 includes an interface module 120, a scan engine 130, a policy engine 140, a policy storage module 150, a configuration engine 160, and a configuration storage module 170. In some embodiments, the operation node can include different or additional components than those illustrated in the embodiment of FIG. 1.

The interface module 120 provides the communicative interface between the operator node 100, the modules of the operator node, the one or more nodes 110, and a user of the operator node. The interface module requests information (such as configuration information) from the nodes 110, for instance in response to a request by the scan engine 130. The interface module receives the requested information, and provides it to one or more other modules or displays it, for instance to a user of the operator node. The interface module can provide a policy to a node 110, can provide requests to a node to configure the node according to the policy, and can generate one or more user interfaces to display policy or configuration information. The interface module can receive input from a user, can provide received inputs to one or more other modules of the operator node or a node 110, and can store policy information and node configuration information (for instance in the policy storage module 150 or the configuration storage module 170, respectively).

The scan engine 130 is configured to scan each of one or more nodes 110 to identify a node configuration and/or node objects installed at the node. In some embodiments, the scan engine scans nodes in response to a request by a user of the operator node 100, in response to a request by the policy engine 140 (to generate or implement a policy), or in response to the passage of a pre-determined period of time (for instance, a periodic scan in order to ensure policy compliance or to gather information about the state of a node over time). In some embodiments, the scan engine simply requests each node to scan itself and provide configuration information and/or information associated with node objects installed at the node, while in other embodiments, the scan engine performs the scan at the node. In some embodiments, the scan engine scans all objects installed at the node, while in other embodiments, the scan engine scans only a pre-determined subset of node objects, for instance objects identified by a node policy.

The policy engine 140 generates and/or implements a node policy for one or more nodes 110. As used herein, "policy" can refer to an identification of a node configuration and/or one or more node objects. Further, a policy can include a set of tests to test for the presence or absence of the identified node configuration or node objects. As used herein, the generation of a node policy refers to the creation of a policy based on an identified or selected node configuration and/or node objects. As used herein, the implementation of a node policy refers to the application of the node policy to a node to identify compliance with the node policy, for instance to determine if the node includes a node configuration and/or node objects identified by the node policy. The implementation of a node policy can further include the configuration of a node based on the node policy, for instance by configuring the node into a node configuration identified by the node policy, and/or to install one or more node objects identified by the node policy. It should be noted that in some embodiments, a node policy can identify a node configuration and/or node objects to exclude. For instance, a policy can identify a software patch to exclude, and implementing such a policy can involve testing for the absence of the identified patch and/or the removal of the identified patch.

The policy engine 140 identifies, for one or more nodes 110, a node configuration of each node and/or node objects installed at each node, for instance by scanning the one or more nodes via the scan engine 130. The policy engine creates a policy based on one or more of: a node configuration, node objects installed at each node, user input identifying one or more objects to include within the policy, a role of a user, or any other suitable information. For instance, the policy engine can identify a set of objects installed at the node (such as software components, hot fixes, patches, and files), can display the identified set of objects to a user, and can receive a selection of a subset of the objects by the user. The policy engine can then generate a policy identifying the selected subset of objects. The policy can be stored in the policy storage module 150 for subsequent use and application. It should be noted that in some embodiments, the policy engine can generate a policy without identifying a node configuration or objects stored at a node. For example, a user of the operator node 100 can select a node configuration or node objects from a pre-generated list of objects presented by the policy engine via the interface module, and can generate a policy based on the selected node configuration or node objects.

Each policy identifies a set of selected node objects, and can include one or more scripts or executable programs configured to test for the presence or absence of the set of selected node objects. Each object identified by a policy can be classified within the policy based on an object type (for instance, an object can be classified as a "patch" or a "driver"), based on an operating system associated with a node (for instance, "OSX" vs. "Windows" vs. "Linux"), based on a hardware type or build associated with the node (for instance, "Cisco" vs. "Juniper"), or based on any other suitable object characteristic or property. Further, each object can be classified as "include" or "exclude" to indicate whether to test for the inclusion or exclusion of a particular object.

In some embodiments, policies also include scripts or executables configured to automate the configuration of a node to include or exclude objects identified by a policy. For instance, a policy can include a set of scripts each configured to install one or more identified objects on a target node. Beneficially, this automates the configuration of a new node included within the network to include a set of objects identified by a particular user as essential for operation within the network, for installation and operation of a particular application, and the like.

In some embodiments, policies can be written in universal languages (such as Ruby, C, and the like), and can identify universal objects (for instance, a particular hot fix for an application). Alternatively, policies can be written in a domain specific language ("DSL"), and can identify domain-specific objects. For instance, a policy generated for a particular server can be written in a proprietary language specific to the server, to the manufacturer or brand of the server, and the like. Similarly, the objects identified by a policy can be domain-specific objects. For instance, a web browser patch for an OSX or iOS machine may be different than a corresponding patch for a Windows machine. Accordingly, the identification of such a patch in a policy may be specific to a particular node configuration.

In order to test a target node for compliance with a policy written in a particular DSL, or to configure a node based on the policy, the policy can be mapped from the DSL to a universal language, or to a DSL corresponding to the target node. Likewise, in order to test a target node for compliance with a policy written in a universal language, the policy can be mapped to a DSL corresponding to the target node. As used herein, such policy mappings are referred to as the mapping of a policy from a first domain to a second domain. To map a policy from a first domain to a second domain, a universal mapping of corresponding objects can be queried for each object in the first domain identified by the policy to identify a corresponding object in the second domain. The universal mapping can map a particular object in a first domain to corresponding objects in each of one or more additional domains. For example, for a particular iOS file corresponding to a security application, the universal mapping can map corresponding Windows and Linux files to the iOS file. Similarly, for each test and automation script or executable in the first domain within the policy, a corresponding script or executable can be generated in the second domain. In some embodiments, the universal mapping is stored at the operator node 100, while in other embodiments, the mapping is stored at another entity within the environment of FIG. 1 or external to the environment of FIG. 1. It should be noted that in some embodiments, instead of a universal mapping, one or more domain-to-domain mappings (mappings from a first domain to a second domain) can be queried to map a policy to a different domain.

Once the policy is mapped from the first domain to the second domain corresponding to the target node, the mapped policy can be applied to the target node. For instance, the target node can be scanned, and the mapped policy can be used to identify whether the target node includes the objects identified by the target node. Likewise, if the policy includes test scripts or executables configured to test for the presence or absence of identified objects, the mapped scripts or executables can be run to test for the presence or absence of objects mapped to the identified objects at the target node. If the policy includes automation scripts or executables configured to configure a target node to include identified objects, the mapped automation scripts or executables can be run to configure a target node to include mapped objects.

The configuration engine 160 is configured to configure one or more nodes within the environment of FIG. 1 based on one or more policies. In embodiments where a policy includes automation scripts or executables configured to configure a target node, the configuration engine can run the automation scripts or executables to configure the target node, for instance automatically or in response to a request by a user of the operator node 100. In embodiments where a policy does not include such automation scripts or executables, the configuration engine can configure a target node by generating and running such automation scripts and executables, by providing a list of the objects identified by the policy to the target node to enable the node to self-configure based on the identified objects, by providing the list of identified objects to a network administrator or manager to enable the administrator or manager to configure the target node, or based on any other suitable method. In embodiments where a target node is within a different domain or is associated with a different DSL than a policy, the configuration engine can map the policy to the domain or DSL associated with the target node before configuring the target node. In some embodiments, the configuration engine is configured to test a target node for compliance with a policy by scanning the target node to identify a configuration of the target node and by identifying configuration differences between the target node and the policy (such as a list of objects identified by the policy that are not installed at the target node). In some embodiments, the configuration engine can store configuration information associated with scanned nodes within the configuration storage module 170.

In some embodiments, the configuration module 160 can, upon scanning a target node to test for compliance with a policy, display (via the interface module 120) the objects identified by the policy and an indication of which of the identified objects are installed at the target node and which of the identified objects are missing from the target node. In some embodiments, such a display can be configured as a delta between the configuration of the target node and the policy, for instance by displaying a list of objects identified by the policy and missing from the target node, or by displaying objects identified by the policy and installed at the target node in a first color and displaying objects identified by the policy and not installed at the target node in a second color. In some embodiments, compliance with a policy and multiple nodes can be displayed, for instance by illustrating the objects identified by the policy and missing from the configuration of each of the nodes within a single interface or display. In such embodiments, the visualization of the compliance of multiple nodes with a policy can be layered such that a user can visualize compliance at a high level (such as at an environment or data center level for multiple nodes), down through medium and low levels (such as node groups and individual nodes). In some embodiments, compliance and non-compliance at each level is displayed with different colors (for instance, compliance and non-compliance for particular objects at an environment level can be displayed with a first and second color, respectively, and compliance and non-compliance at a node group level can be displayed with a third and fourth color, respectively).

In some embodiments, the configuration module 160 can configure multiple nodes simultaneously or substantially simultaneously using a particular policy. In such embodiments, the configuration module 160 can identify, for each of the multiple nodes, a set of objects identified by the policy and not installed at the node, and can install the identified set of objects at the node. In some embodiments, a node can be configured with multiple policies. For instance, a first policy corresponding to (for example) security objects can be used to configure a target node, and a second policy corresponding to (for example) networking objects can be used to configured the target node. In such embodiments, the security objects identified by the first policy can be different than the networking objects identified by the second policy, and thus the target node can be configured according to both policies simultaneously.

Figure 2:
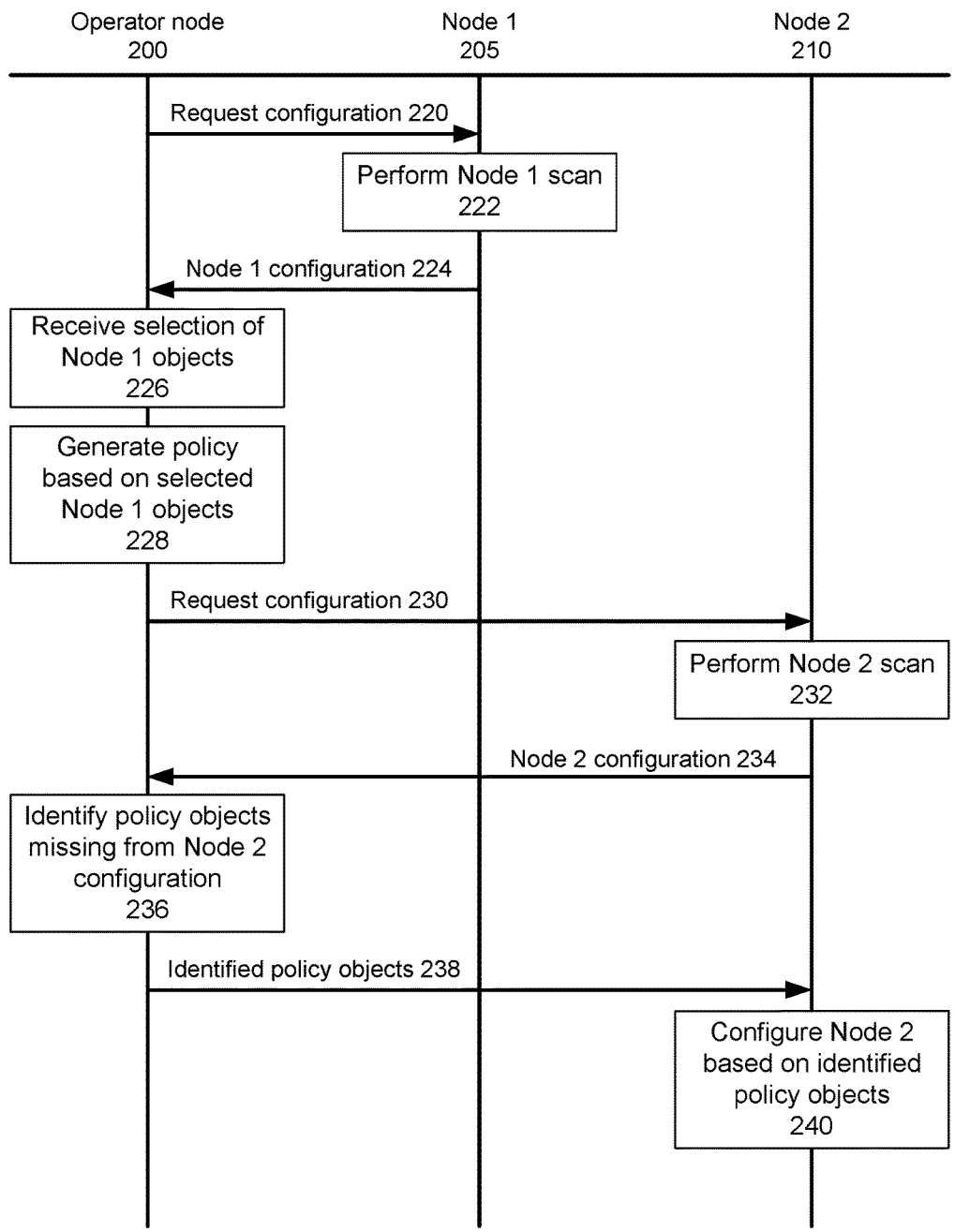
FIG. 2 is an interaction diagram illustrating the generation of a node policy and the configuration of a node based on the policy, according to one embodiment.

FIG. 2 is an interaction diagram illustrating the generation of a node policy and the configuration of a node based on the policy, according to one embodiment. In the embodiment of FIG. 2, an operator node 200, a first node ("Node 1") 205, and a second node ("Node 2") 210 interact within a network. The operator node 200 sends a request 220 for configuration information to Node 1. A scan of Node 1 is performed 222 in response to the request to determine the configuration of Node 1 (such as the objects installed at Node 1). The configuration information 224 of Node 1 is provided to the operator node, which receives 226 a selection of objects installed at Node 1, for instance from a user or network administrator/manager. A policy is then generated 228 by the operator node based on the selected Node 1 objects.

The operator node 200 sends a request 230 for configuration information to Node 2. A scan of Node 2 is performed 232 (for instance, to identify objects installed at Node 2), and the resulting configuration information 234 of Node 2 is provided to the operator node. The operator node identifies 236 objects identified in the policy that are missing from the Node 2 configuration (e.g., objects identified in the policy that are not installed at Node 2). The identified policy objects 238 missing from the configuration of Node 2 are provided to Node 2, and Node 2 is configured 240 based on the identified policy objects (for instance, by installing the identified policy objects at Node 2). It should be noted that in some embodiments, if Node 2 is a new node being added to a network, instead of scanning Node 2 to identify policy objects missing from the configuration of Node 2, a list of all objects identified by the policy can be provided to Node 2, and Node 2 can be configured to include the list of objects.

Figure 3:
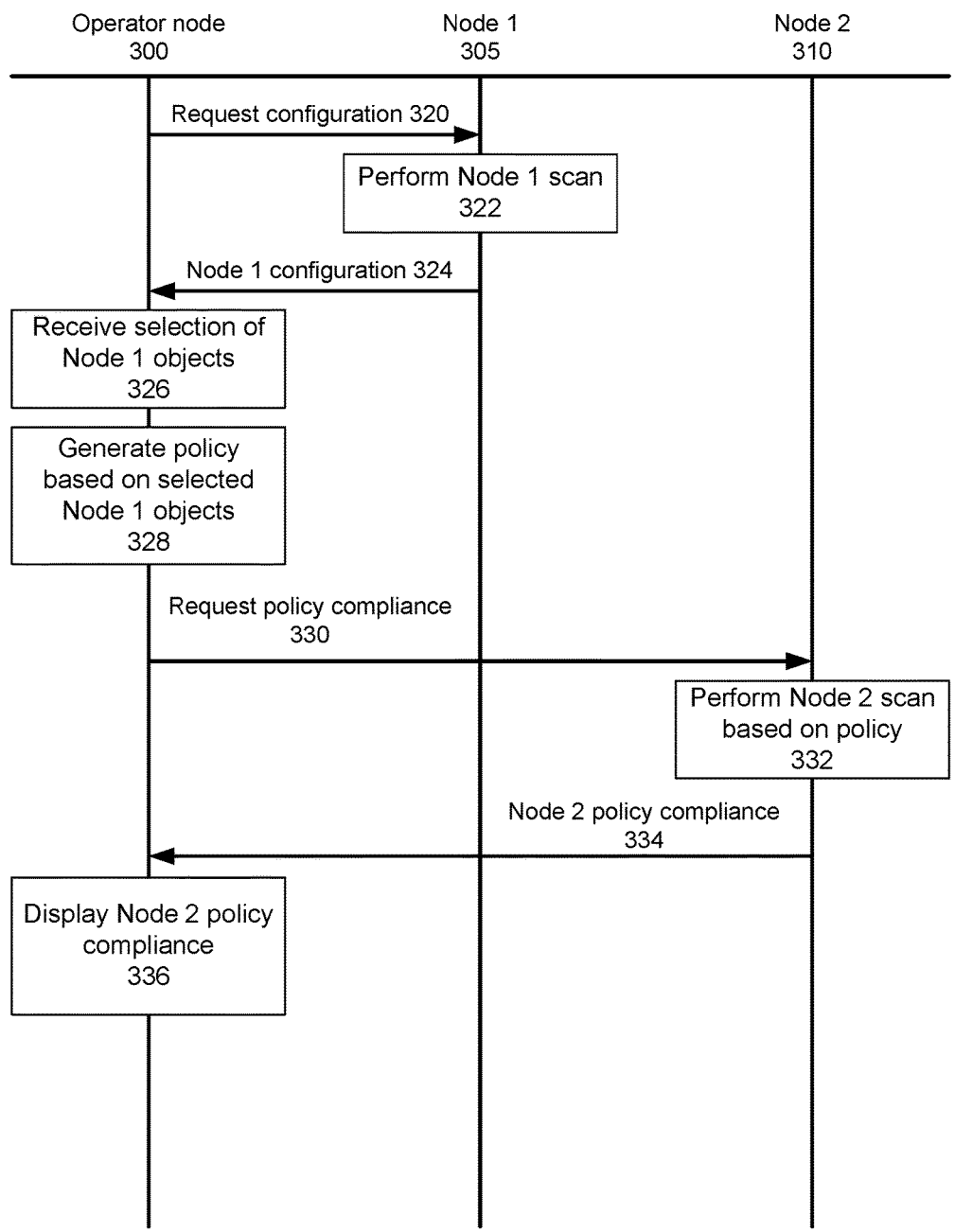
FIG. 3 is an interaction diagram illustrating the generation of a node policy and the testing of a node for compliance with the policy, according to one embodiment.

FIG. 3 is an interaction diagram illustrating the generation of a node policy and the testing of a node for compliance with the policy, according to one embodiment. In the embodiment of FIG. 2, an operator node 300, a first node ("Node 1") 305, and a second node ("Node 2") 310 interact within a network. The operator node sends a request 320 for configuration information to Node 1, a scan of Node 1 is performed 322, and configuration information 324 describing the configuration of Node 1 is provided to the operator node. A selection of Node 1 objects is received, and a policy is then generated 328 by the operator node based on the selected Node 1 objects.

The operator node 300 requests 330 a policy compliance determination of Node 2 in view of the generated policy. A scan of Node 2 is performed 332 based on the policy. For instance, Node 2 is scanned to identify the presence or absence of objects identified within the policy. Policy compliance information 334 describing the compliance of Node 2 with the policy is provided to the operator node, and the operator node displays 336 the policy compliance information. For instance, the operator node can identify objects identified within the policy but missing from the configuration of Node 2, and can display a user interface illustrating the identified missing objects to a user of the operator node (such as a network manager or administrator).

Figure 4:
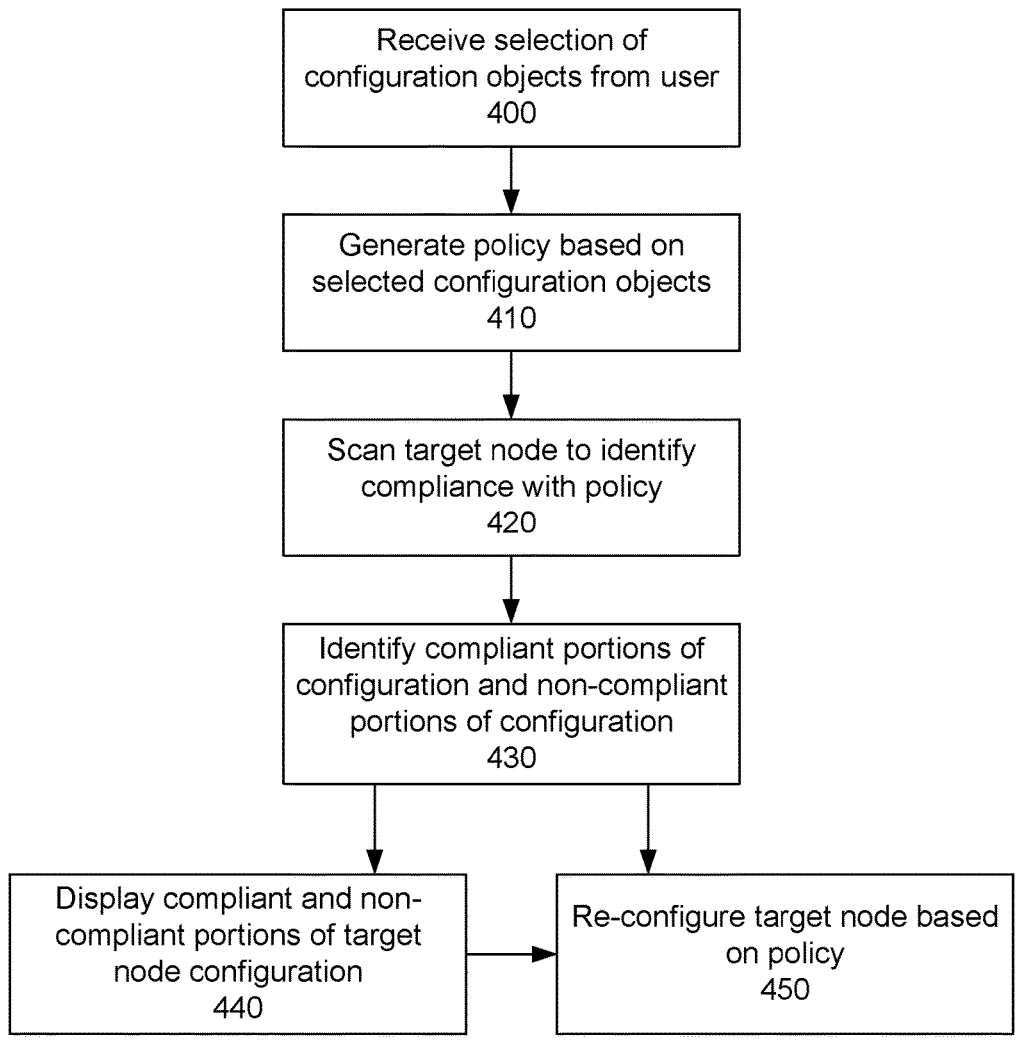
FIG. 4 is a flowchart illustrating the generation and implementation of a node policy, according to one embodiment.

FIG. 4 is a flowchart illustrating the generation and implementation of a node policy, according to one embodiment. A selection of configuration objects is received 400 from a user. For instance, a set of files, hot fixes, patches, and drivers can be selected by a network manager or node configuration application. A policy is generated 410 based on the selected objects. A target node is subsequently scanned 420 to identify compliance with the policy. Compliant portions of the target node configuration (for instance, objects identified by the policy and installed at the target node) and non-compliant portions of the target configuration (for instance, objects identified by the policy but not installed at the target node) are identified 430. One of more of the identified compliant and non-compliant portions of the target node configuration are displayed 440. For instance, the objects identified by the policy and not installed at the target node can be graphically displayed within a user interface to a user. The target node is re-configured 450 based on the policy, by installing objects identified by the policy and not currently installed at the target node.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for network management by an operator node comprising a specially configured hardware computing system, the method comprising:
   receiving, by the operator node, a selection of node objects for inclusion within a node configuration, each selected node object comprising a node software component;
   generating, by the operator node, a configuration policy based on the selected node objects, the configuration policy identifying the selected node objects and comprising a set of tests that, when run, test for a presence of one or more of the selected node objects;
   scanning a target node communicatively coupled to the operator node to determine a configuration of the target node;
   applying the configuration policy to the determined configuration of the target node, wherein applying the configuration policy comprises running the set of tests on the determined configuration of the target node to determine the presence of the selected node objects identified by the configuration policy;
   identifying, based on the application of the configuration policy to the determined configuration of the target node, a set of the selected node objects identified by the configuration policy not present within the node configuration;
   displaying, by the operator node, a graphic user interface including the identified set of the selected node objects on a display associated with the operator node; and
   re-configuring, by the operator node, the target node to include the identified set of the selected node objects.

2. The method of claim 1, wherein receiving a selection of node objects for inclusion within a node configuration comprises:
   receiving, by the operator node, a selection of a node communicatively coupled to the operator node;
   scanning, by the operator node, the selected node to determine a configuration of the selected node, the determined configuration identifying a plurality of node objects installed at the selected node;
   receiving, by the operator node, a selection of a subset of the plurality of node objects installed at the selected node.

3. The method of claim 2, wherein the selection of the subset of the plurality of node objects is received from a user of the operator node.

4. The method of claim 3, wherein receiving the selection of the subset of the plurality of node objects installed at the selected node comprises:
   displaying, by the operator node, the plurality of node objects installed at the selected node within the graphic user interface; and
   receiving, via the user interface, the selection of the subset of the plurality of node objects from the user of the operator node.

5. The method of claim 1, wherein the set of tests of the configuration policy comprises a set of scripts or executables that, when run, determine the presence of one or more of the selected node objects at the target node.

6. The method of claim 1, wherein scanning the target node communicatively coupled to the operator node to determine a configuration of the target node comprises initiating a self-scan of the target node by the target node and receiving the configuration of the target node in response to the self-scan.

7. The method of claim 1, wherein re-configuring the target node to include the identified set of the selected node objects comprises installing each of the identified set of the selected node objects at the target node.

8. An operator node for network management, the operator node comprising a hardware computing system specially configured to perform steps comprising:
   receiving, by the operator node, a selection of node objects for inclusion within a node configuration, each selected node object comprising a node software component;
   generating, by the operator node, a configuration policy based on the selected node objects, the configuration policy identifying the selected node objects and comprising a set of tests that, when run, test for a presence of one or more of the selected node objects;
   scanning a target node communicatively coupled to the operator node to determine a configuration of the target node;
   applying the configuration policy to the determined configuration of the target node, wherein applying the configuration policy comprises running the set of tests on the determined configuration of the target node to determine the presence of the selected node objects identified by the configuration policy;
   identifying, based on the application of the configuration policy to the determined configuration of the target node, a set of the selected node objects identified by the configuration policy not present within the node configuration;
   displaying, by the operator node, a graphic user interface including the identified set of the selected node objects on a display associated with the operator node; and
   re-configuring, by the operator node, the target node to include the identified set of the selected node objects.

9. The operator node of claim 8, wherein receiving a selection of node objects for inclusion within a node configuration comprises:
   receiving, by the operator node, a selection of a node communicatively coupled to the operator node;
   scanning, by the operator node, the selected node to determine a configuration of the selected node, the determined configuration identifying a plurality of node objects installed at the selected node;
   receiving, by the operator node, a selection of a subset of the plurality of node objects installed at the selected node.

10. The operator node of claim 9, wherein the selection of the subset of the plurality of node objects is received from a user of the operator node.

11. The operator node of claim 10, wherein receiving the selection of the subset of the plurality of node objects installed at the selected node comprises:
   displaying, by the operator node, the plurality of node objects installed at the selected node within the graphic user interface; and
   receiving, via the user interface, the selection of the subset of the plurality of node objects from the user of the operator node.

12. The operator node of claim 8, wherein the set of tests of the configuration policy comprises a set of scripts or executables that, when run, determine the presence of one or more of the selected node objects at the target node.

13. The operator node of claim 8, wherein scanning the target node communicatively coupled to the operator node to determine a configuration of the target node comprises initiating a self-scan of the target node by the target node and receiving the configuration of the target node in response to the self-scan.

14. The operator node of claim 8, wherein re-configuring the target node to include the identified set of the selected node objects comprises installing each of the identified set of the selected node objects at the target node.

15. A non-transitory computer-readable storage medium storing executing computer instructions for network management, the instructions, when executed, cause an operator node comprising a specially configured hardware computing system to perform steps comprising:
   receiving, by the operator node, a selection of node objects for inclusion within a node configuration, each selected node object comprising a node software component;
   generating, by the operator node, a configuration policy based on the selected node objects, the configuration policy identifying the selected node objects and comprising a set of tests that, when run, test for a presence of one or more of the selected node objects;
   scanning a target node communicatively coupled to the operator node to determine a configuration of the target node;
   applying the configuration policy to the determined configuration of the target node, wherein applying the configuration policy comprises running the set of tests on the determined configuration of the target node to determine the presence of the selected node objects identified by the configuration policy;
   identifying, based on the application of the configuration policy to the determined configuration of the target node, a set of the selected node objects identified by the configuration policy not present within the node configuration;
   displaying, by the operator node, a graphic user interface including the identified set of the selected node objects on a display associated with the operator node; and
   re-configuring, by the operator node, the target node to include the identified set of the selected node objects.

16. The computer-readable storage medium of claim 15, wherein receiving a selection of node objects for inclusion within a node configuration comprises:
   receiving, by the operator node, a selection of a node communicatively coupled to the operator node;
   scanning, by the operator node, the selected node to determine a configuration of the selected node, the determined configuration identifying a plurality of node objects installed at the selected node;
   receiving, by the operator node, a selection of a subset of the plurality of node objects installed at the selected node.

17. The computer-readable storage medium of claim 16, wherein the selection of the subset of the plurality of node objects is received from a user of the operator node.

18. The computer-readable storage medium of claim 17, wherein receiving the selection of the subset of the plurality of node objects installed at the selected node comprises:
   displaying, by the operator node, the plurality of node objects installed at the selected node within the graphic user interface; and
   receiving, via the user interface, the selection of the subset of the plurality of node objects from the user of the operator node.

19. The computer-readable storage medium of claim 15, wherein the set of tests of the configuration policy comprises a set of scripts or executables that, when run, determine the presence of one or more of the selected node objects at the target node.

20. The computer-readable storage medium of claim 15, wherein re-configuring the target node to include the identified set of the selected node objects comprises installing each of the identified set of the selected node objects at the target node.

* * * * *